US009420152B2

United States Patent
Eromäki

(10) Patent No.: US 9,420,152 B2
(45) Date of Patent: Aug. 16, 2016

(54) CAMERA WITH A REFLECTIVE ELEMENT

(71) Applicant: Microsoft Corporation, Redmond, WA (US)

(72) Inventor: Marko Eromäki, Tampere (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/472,797

(22) Filed: Aug. 29, 2014

(65) Prior Publication Data
US 2016/0065808 A1    Mar. 3, 2016

(51) Int. Cl.
*H04N 5/225* (2006.01)
*G03B 17/00* (2006.01)
*H04M 1/02* (2006.01)

(52) U.S. Cl.
CPC ............. *H04N 5/2254* (2013.01); *G03B 17/00* (2013.01); *H04M 1/0264* (2013.01); *H04N 5/2251* (2013.01); *H04N 5/2252* (2013.01)

(58) Field of Classification Search
CPC ............................ G03B 17/17; H04N 13/0235
USPC .............. 348/14.1, 218.1, 343, 344, 373–376; 235/462.11; 455/575.4
See application file for complete search history.

(56) References Cited

U.S. PATENT DOCUMENTS

| | | | |
|---|---|---|---|
| 2003/0040346 A1 | 2/2003 | Fukuda et al. | |
| 2003/0095200 A1 | 5/2003 | Nagano | |
| 2004/0012683 A1 | 1/2004 | Yamasaki et al. | |
| 2005/0264984 A1* | 12/2005 | Lee | H04M 1/0237 361/379.04 |
| 2008/0161075 A1* | 7/2008 | Kim | H04M 1/0237 455/575.4 |
| 2008/0205873 A1* | 8/2008 | Park | G03B 11/06 396/200 |
| 2008/0261665 A1* | 10/2008 | Kwon | H04M 1/0237 455/575.4 |

(Continued)

FOREIGN PATENT DOCUMENTS

| | | |
|---|---|---|
| CN | 1949020 A | 4/2007 |
| JP | 2012226286 A | 11/2012 |
| JP | 2013080168 A | 5/2013 |

OTHER PUBLICATIONS

Khan, Aarzu, "How to Make Video Calls without Having Front Face Camera Mobile Phone", Published on: Jan. 4, 2011, Available at: http://www.dazeinfo.com/2011/01/04/how-to-make-video-calls-without-having-front-face-camera-mobile-phone/.

(Continued)

*Primary Examiner* — Twyler Haskins
*Assistant Examiner* — Dwight C Tejano
(74) *Attorney, Agent, or Firm* — Judy Yee; Micky Minhas; Zete Law, P.L.L.C.

(57) ABSTRACT

A hand-held device comprises two bodies that are connected to each other. The first body and the second body have two predefined positions, an open position and a closed position. In an embodiment, the first and the second body are connected by a hinge that may comprise one or more arms, enabling different embodiments for the open and closed positions. The first body comprises a camera that has different functions in the open and closed positions. In the closed position the second body may cover the camera, thus providing protection to the camera in the first body. The second body has a reflective element, such as a mirror that reflects an image to the camera in the open position. An imaging device may enable one camera and one flash unit for two-directional imaging purposes and introduce multiple imaging modes.

20 Claims, 15 Drawing Sheets

(56) References Cited

U.S. PATENT DOCUMENTS

| | | | |
|---|---|---|---|
| 2009/0002797 A1 | 1/2009 | Kwong et al. | |
| 2009/0135294 A1 | 5/2009 | Hirai et al. | |
| 2009/0161004 A1 | 6/2009 | Yuan | |
| 2009/0247247 A1* | 10/2009 | Jang | H04M 1/0237 455/575.4 |
| 2009/0286573 A1* | 11/2009 | Jang | G06F 1/1616 455/566 |
| 2010/0328420 A1 | 12/2010 | Roman | |
| 2011/0043683 A1* | 2/2011 | Beach | G02B 13/0065 348/373 |
| 2011/0081946 A1* | 4/2011 | Singh | H04N 5/2254 455/556.1 |
| 2014/0055624 A1 | 2/2014 | Gaines et al. | |

OTHER PUBLICATIONS

"International Search Report & Written Opinion for PCT Patent Application No. PCT/US2015/047066", Mailed Date: Oct. 28, 2015, Filed Date: Aug. 27, 2015, 9 Pages.

Second Written Opinion Issued in PCT Application No. PCT/US2015/047066, Mailed Date: Apr. 20, 2016, 5 Pages.

* cited by examiner

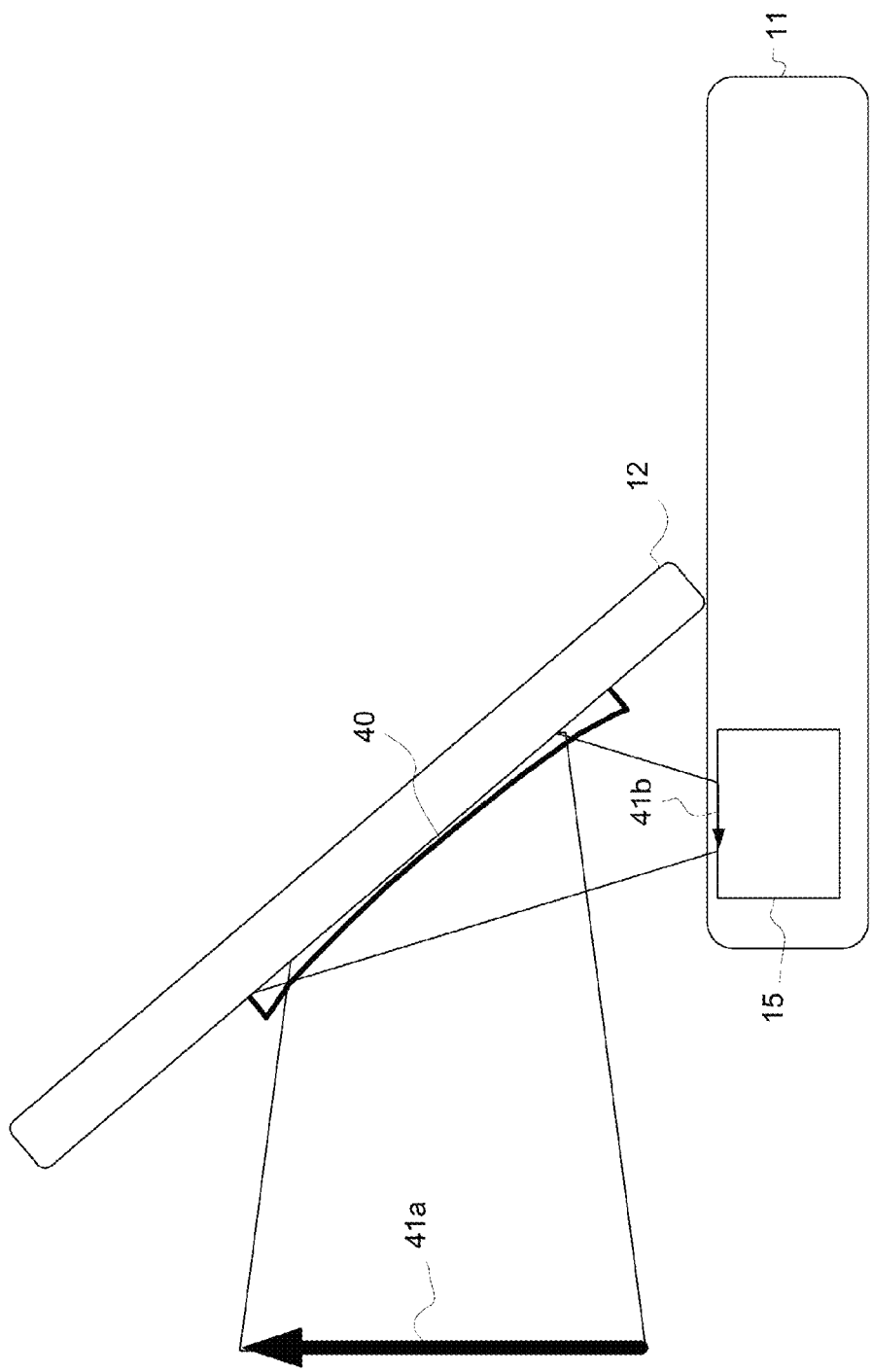

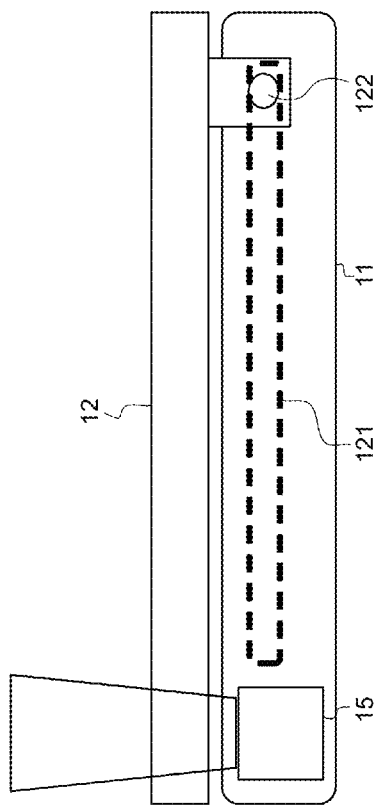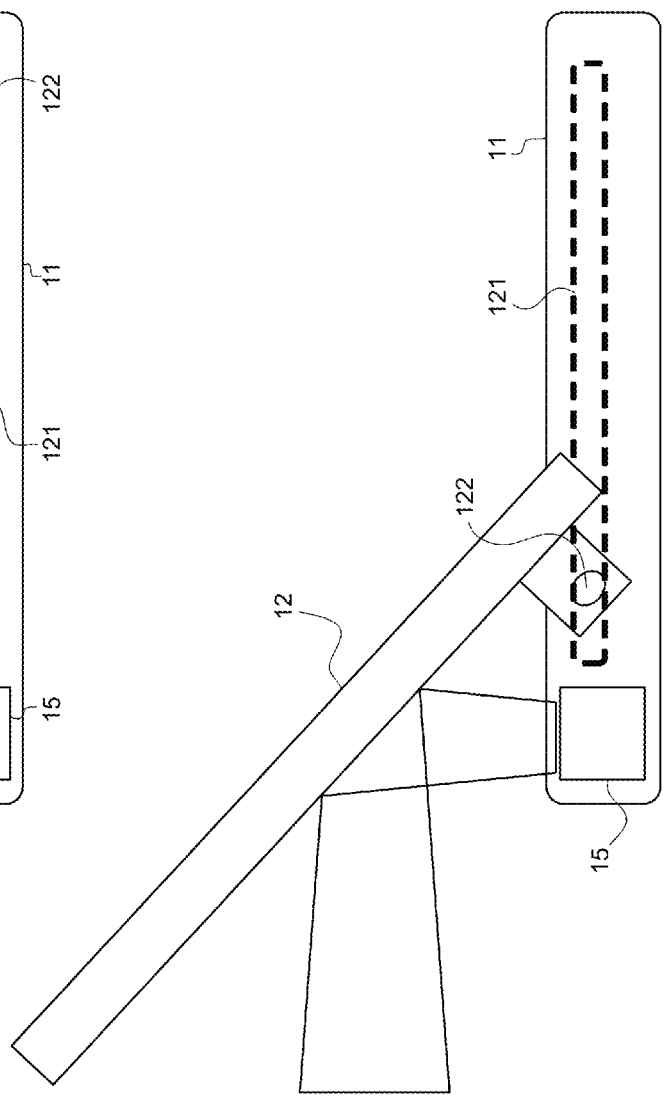

CAMERA WITH A REFLECTIVE ELEMENT

BACKGROUND

Digital cameras usually comprise a lens and a sensor for capturing an image by capturing light and converting it into electrical signals. Mobile electronic devices such as smart phones are usually equipped with a camera, often several cameras may be integrated in the housing. For example in the so called unibody design, a first camera with better optical characteristics is usually on the backside and a second camera on the front for taking pictures or videos of the user of the device. Cameras are increasingly being integrated in different hand-held devices such as game controllers. It may not be reasonable to integrate the most expensive camera or camera modules for all needs of the device.

The embodiments described below are not limited to implementations which solve any or all of the disadvantages of known cameras integrated in hand-held devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A portable or hand-held apparatus comprises two bodies that are or may be connected to each other physically. The apparatus comprises a first body and a second body and has two predefined positions, an open position and a closed position. In an embodiment the first and the second body are connected by a hinge. The hinge may be of eg. barrel type, or other types of hinges may be used. Instead of or in addition to any before mentioned hinge, the hinge may comprise one or more arms, enabling different embodiments for the open and closed positions. The first body comprises a camera that has different functions in the open and closed positions. In the closed position the second body may cover the camera, thus providing protection to the camera in the first body. The second body has a reflective element, such as a mirror that reflects an image to the camera when the apparatus is in the open position. The apparatus may enable one camera and one flash unit to be used for two-directional imaging purposes and introduce multiple imaging modes. According to an embodiment, only one camera that is fixedly attached to the first body may be used for different functions in either open or closed positions.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein:

FIG. 4 is a schematic diagram of an apparatus comprising the reflective element deformed to convex form;

FIG. 12a is a schematic diagram of an apparatus in a closed position, illustrating slidable hinge; and FIG. 12b is a schematic diagram of the apparatus in an open position.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in a smartphone, the device described is provided as an example and not a limitation. As those skilled in the art will appreciate, the present examples are suitable for application in a variety of different types of mobile and/or hand-held apparatuses, e.g. in tablets and laptops.

Figure 1A:
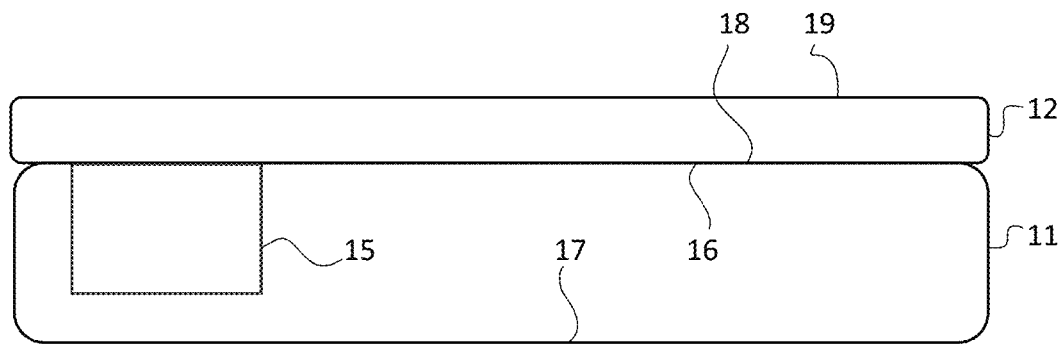
FIG. 1a is a schematic diagram of an apparatus in a closed position.
Figure 1B:
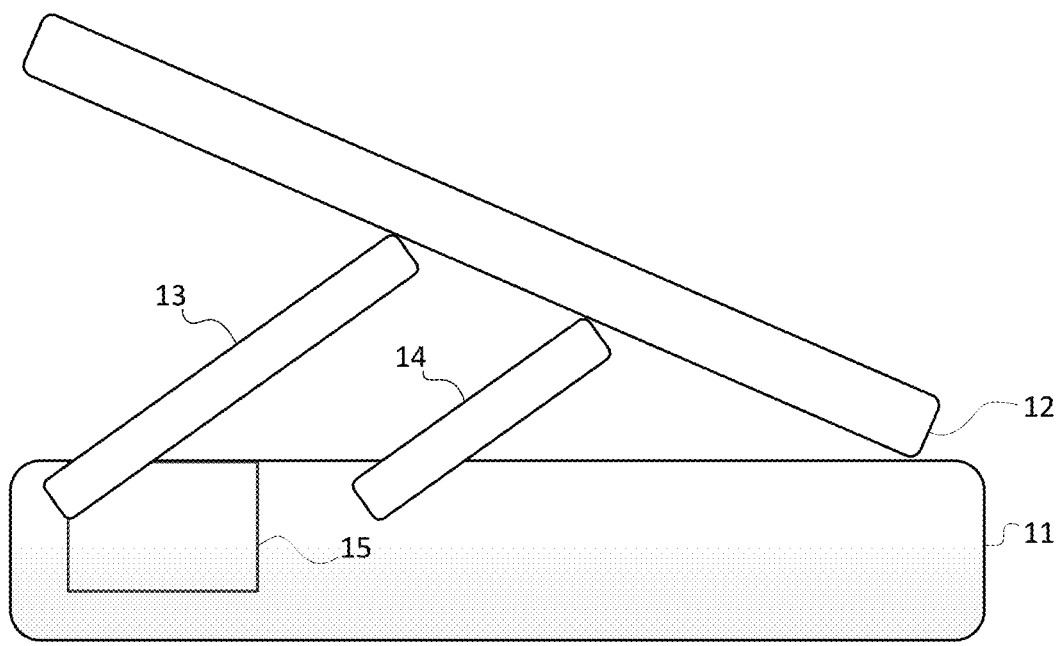
FIG. 1b is a schematic diagram of the apparatus in an opening sequence between the open position and the closed position.
Figure 1C:
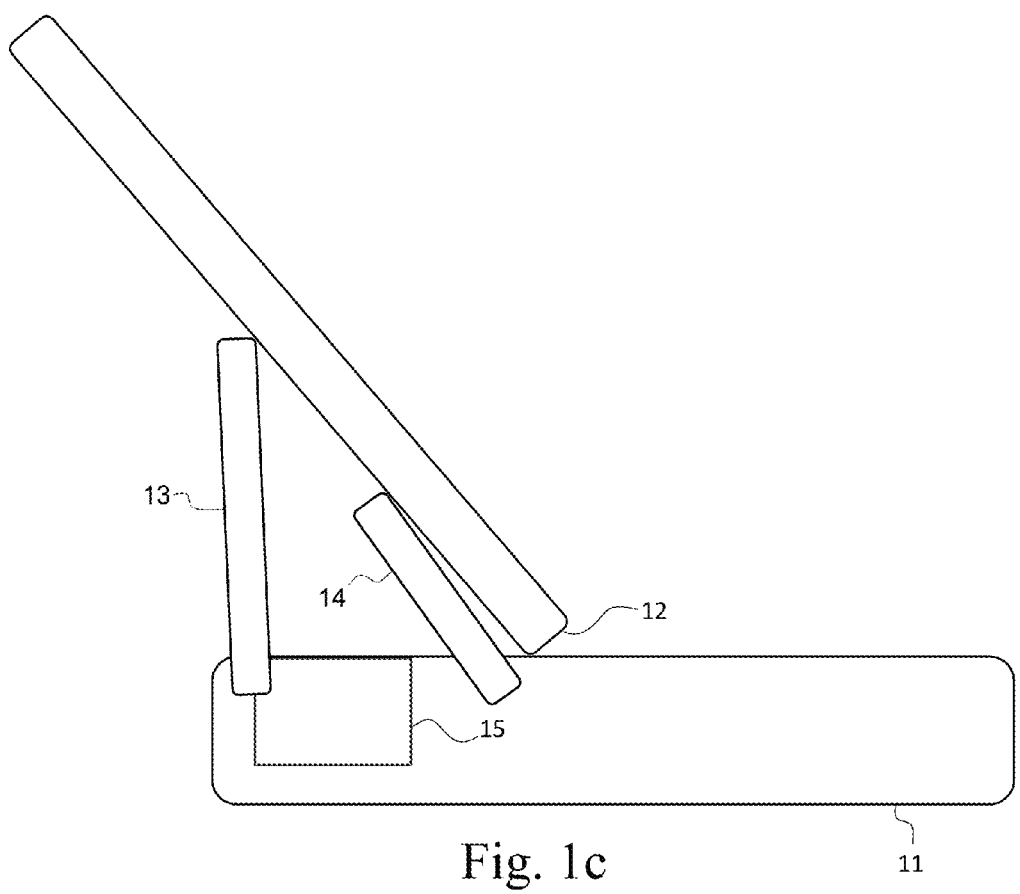
FIG. 1c is a schematic diagram of the apparatus in an open position.

FIG. 1a shows an apparatus in a closed mode. A first body 11 comprises a camera 15 on a first side 16 of the first body 11. The camera 15 may have only a portion visible on the first side 16, such as the lens, wherein the rest of the camera may be embedded inside the first body 11. The second side 17 of the first body 11 and/or the second side 19 of the second body 12 may comprise any functionality, element or component configured to operate or interact with the apparatus. Examples of such functionality, element or component are keypad, display, touch user interface, speaker or microphone. The second body 12 is attached to the first body 11. In an embodiment, the first body 11 and the second body 12 are hingedly connected; for example, the form factor of the apparatus may be a clamshell or a flip phone. FIG. 1b shows another example of connecting the first body 11 and the second body 12 by at least one elongated member 13 having a first end and a second end, the elongated member 13 being hingedly connected from the first end to the first body 11 and from the second end to the second body 11. In this example the at least one elongated member comprises two elongated members comprising a double lever 13, 14 folding mechanism. A continuous opening movement starts from the closed position in FIG. 1a, following in FIG. 1b an example of the bodies 11, 12 being opened, and in FIG. 1c the apparatus is illustrated in the open position.

The first body 11 and the second body 12 are connected both physically and electronically, wherein both parts may comprise modules or components that share electronic signals, messages or hardware functions. In an embodiment the first body 11 and the second body 12 may be separable, for example the first body comprising a keyboard and the second body comprising a display. In the open position the first body 11 and the second body 12 are moved into the extreme position and the position may be limited and/or fixed, not allowing movement between the first body 11 and the second body 12.

Figure 2:
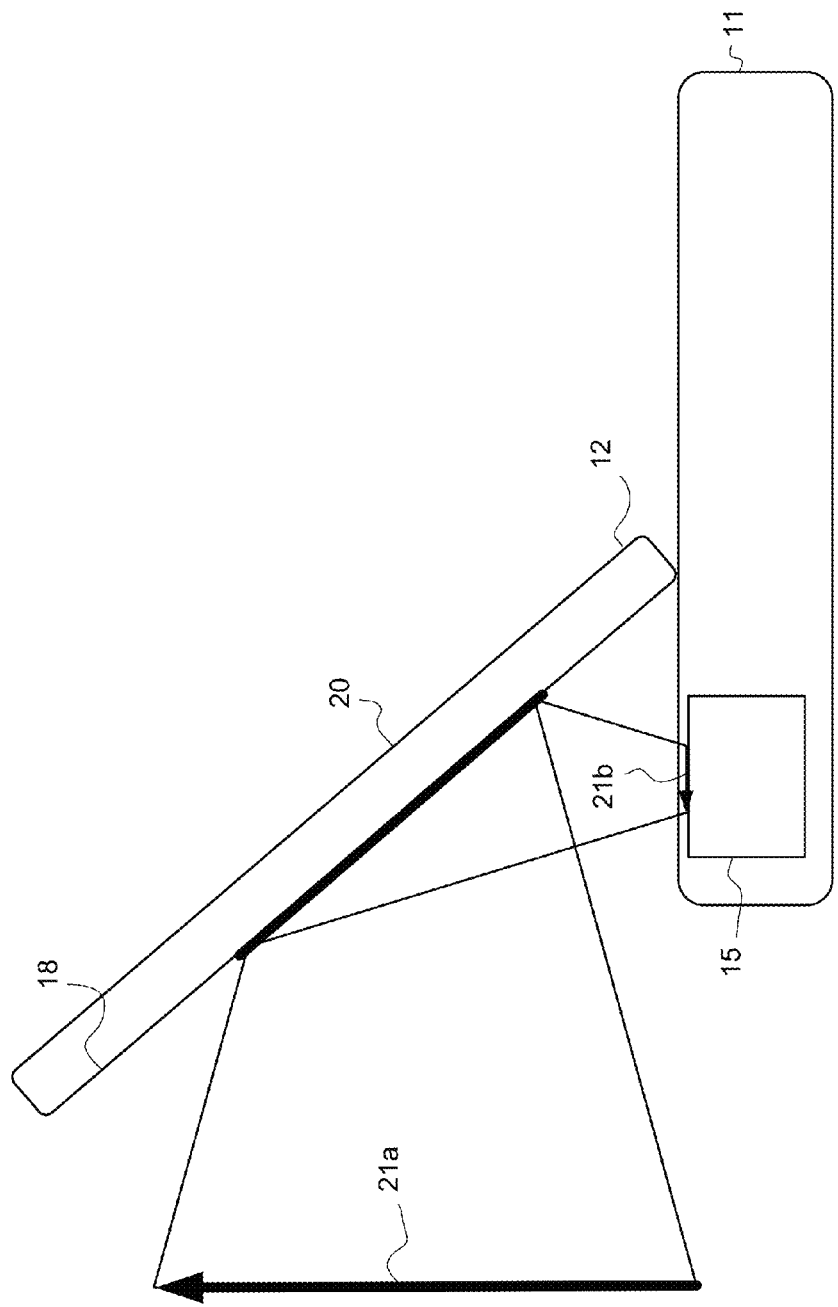
FIG. 2 is a schematic diagram of an apparatus comprising a reflective element.

FIG. 2 shows an example of an embodiment of the apparatus in the open position, the second body 12 comprising a reflective element 20 on the first side 18 of the second body 12. For illustrative purposes a connecting device such as a hinge is omitted from the drawing. The reflective element 20 may comprise a surface such as a mirror, polished metal or the like. In the closed position the first side 16 of the first body 11 and the first side 18 of the second body 12 are facing each other, the second body 12 thereby covering the camera 15 and the first body 11 covering the reflective element 20. An embodiment is shown in FIG. 2, wherein in the open position the reflective element 20 reflects light from a subject 21a to the camera 15. The image of the subject 21b is illustrated near the camera 15 to highlight the reflection.

Figure 3:
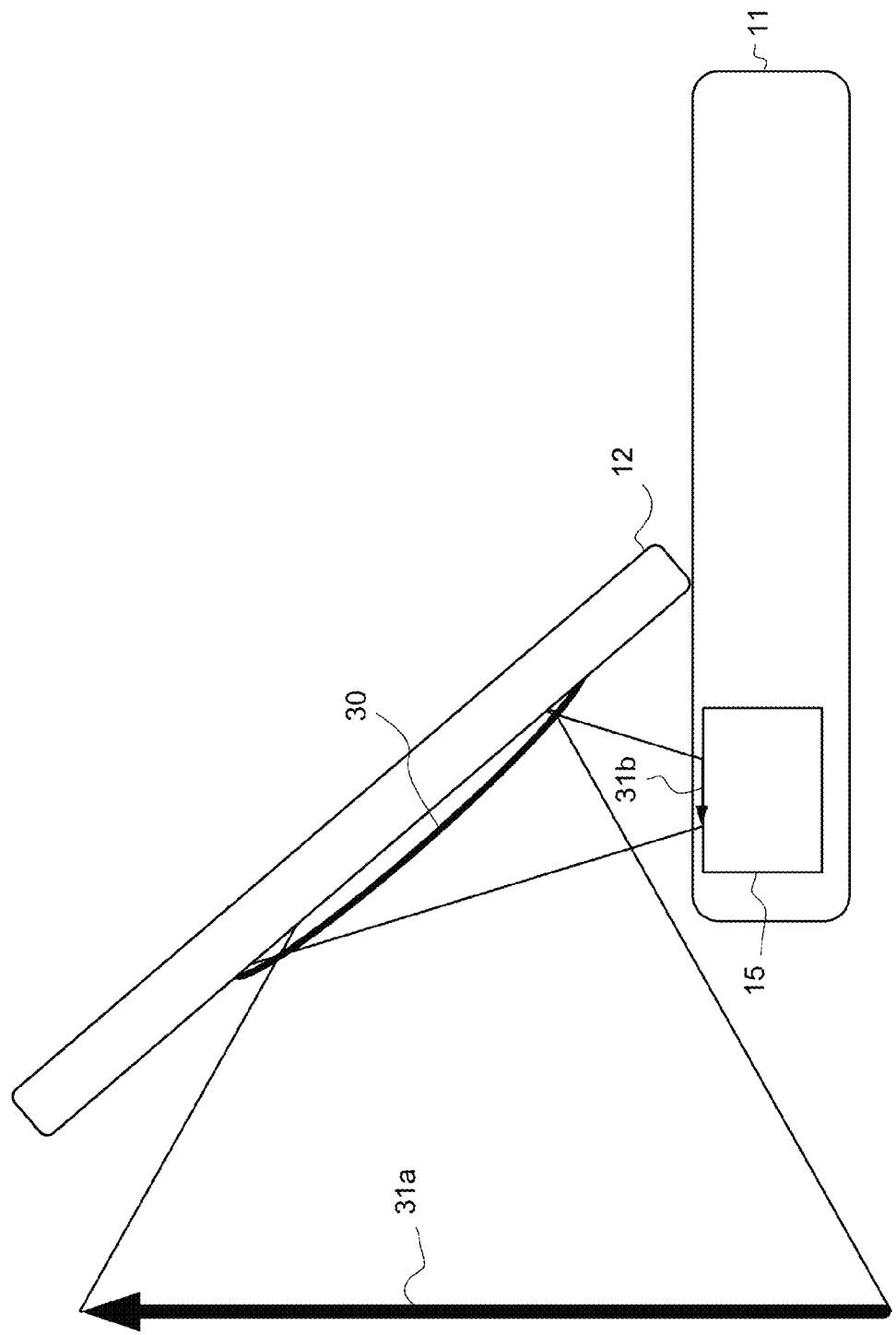
FIG. 3 is a schematic diagram of an apparatus comprising the reflective element deformed to concave form.

FIG. 3 is an example of an embodiment of the apparatus in the open position. The reflective element 30 comprises a surface and a reflection control element that causes at least the surface of the reflective element 30 to deform. In an embodiment, the reflective element 30 comprises means for deforming at least the surface of the reflective element 30. Deforming of the surface means altering the optical characteristics of the reflective element 30. For example, the reflective surface 30 may curve to change the field of vision for the camera 15.

In an embodiment, the reflection control element 30 causes the reflectivity of the reflective element to change. The reflection control element 30 comprises means for changing the reflectivity of the reflective element. The reflective element may comprise an LCD panel that is controllably configured to dim the reflection to the camera 15. This may be used for example to control the brightness of the image that the camera 15 perceives.

In an embodiment, the reflective surface 30 is curved to achieve a zooming effect without significant optical losses. In this example the reflective surface 30 is convex; therefore, an image 31b of a larger subject 31a can be viewed by the camera 15. The convex reflective surface 30 results in a wide angle for the field of vision. In an embodiment, the reflective surface 30 is fixed to the convex shape, wherein the camera can be designed with a natively narrower cone. This leads to improvements in design, manufacturing tolerances, easier manufacturing, and a better yield.

FIG. 4 illustrates an example of an embodiment, where the reflective surface 40 is concave; therefore, an image 41b of a subject 41a being at a further distance can be viewed by the camera 15. Changing the reflective surface 40 to be concave results in a zooming effect without significant light losses. The Transforming concave-flat-convex reflective surface 40 provides powerful and flat zooming effect. In an embodiment, the surface of the reflective element 40 comprises a MEMS micromirror array for deforming the surface (MEMS, microelectromechanical systems). The MEMS micromirror array is able to change the surface 40 shape or a reflective flexible membrane film. In one embodiment, the means for deforming the surface of the reflective element 40 is a magnetic element. The reflective element 40 comprises a magnetic element for deforming at least the surface of the reflective element 40.

Figure 5A:
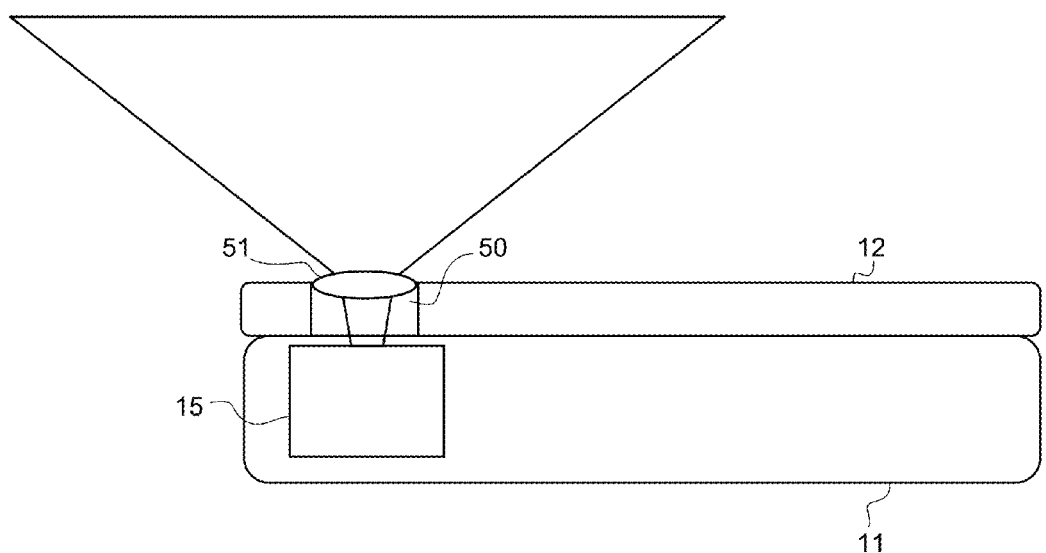
FIG. 5a is a schematic diagram of an apparatus in a closed position comprising an aperture and a lens in the second body.
Figure 5B:
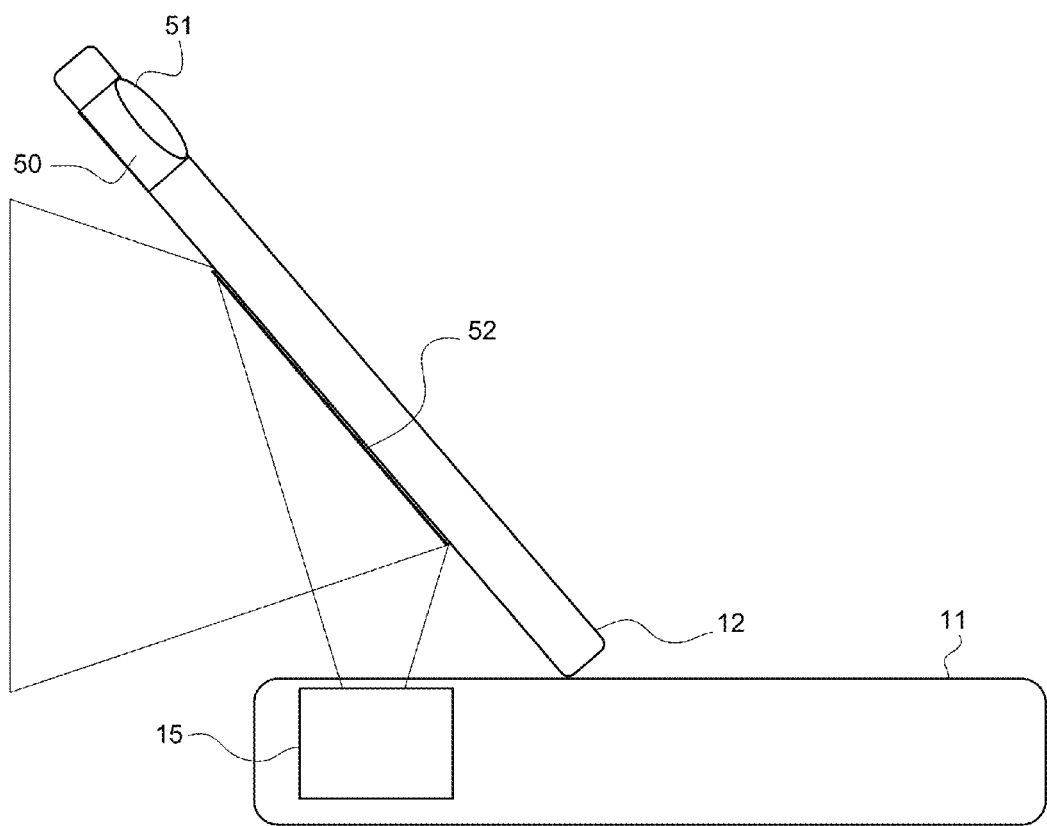
FIG. 5b is a schematic diagram of the apparatus in an open position comprising an aperture and a lens in the second body.

An embodiment comprises a lens in the second body positioned in the second body so that when the apparatus is in the closed position, the lens is, in a traverse direction to a horizontal plane of the second body, at least partially aligned with the camera allowing light to enter the camera through the lens. FIG. 5a shows an example of an embodiment; wherein in the closed position the second body 12 covering the camera 15 comprises a lens 51 allowing the light to enter the camera 15. The second body comprises a through aperture 51, wherein the lens 51 is attached. The optical characteristics of the camera 15 may be altered with the second lens 51. For example, the structure may result in an ultra-wide view between 150 and 170 degrees. This enables the main camera 15 to be used for front camera purposes, such as taking images of the user. Other applications for the wide angle camera include conference video calls to capture multiple participants. The second lens 51 is positioned in front of the camera in the closed position by the folding mechanism. The lens 51 may be aligned in parallel or along with the optical axis of the camera or the imaging direction. FIG. 5b shows the same example in an open position, wherein the second lens 51 and the aperture 50 are located outside the reflective element 52 and not affecting the imaging by the camera 15 in the open position.

Figure 6:
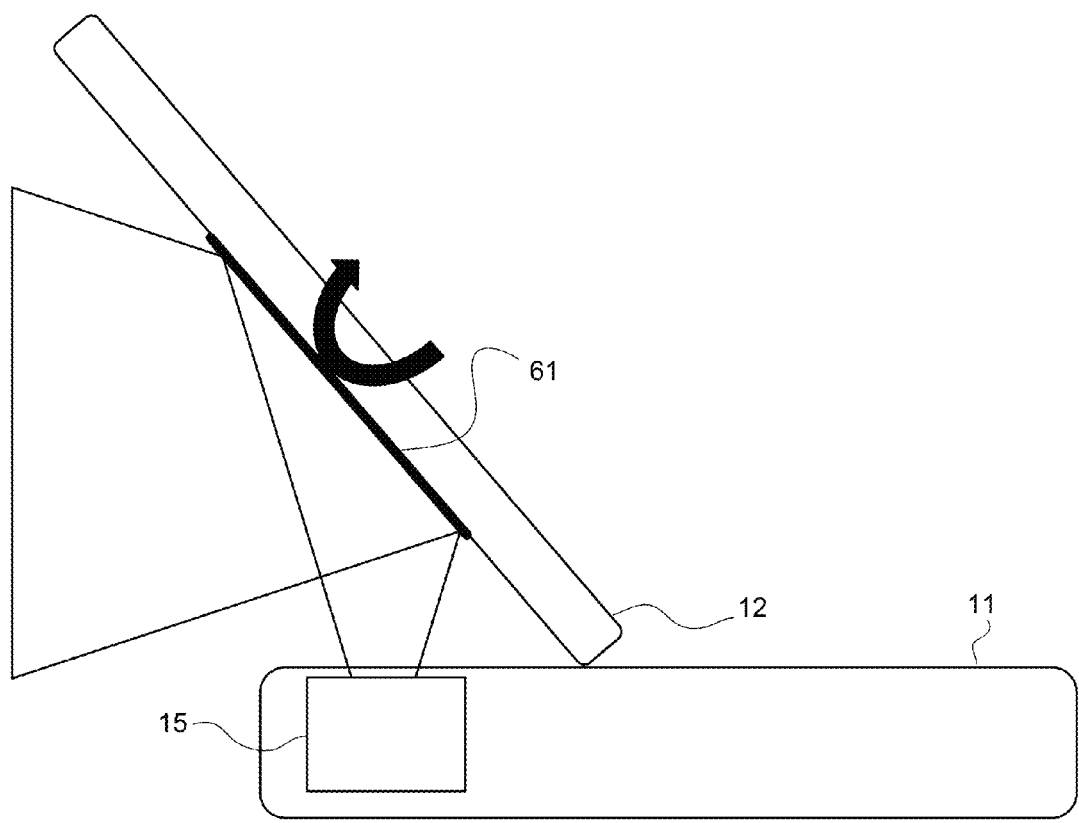
FIG. 6 is a schematic diagram of an apparatus comprising a tilting reflective surface.

In an embodiment the reflection control element comprises a receiver for receiving input data corresponding to a camera movement, and the reflection control element, when operated, causes at least the surface of the reflective element to tilt in at least one rotational direction to correct for at least some of the camera movement. FIG. 6 shows an example of an embodiment, wherein the reflection control element comprises a receiver for the input data corresponding to a camera 15 movement and the reflection control element causes at least the surface of the reflective element 61 to tilt in at least one rotational direction to correct for at least some of the camera 15 movement. The reflection control element comprises means for receiving the input data corresponding to a camera 15 movement. The reflection control element comprises means for tilting at least the surface of the reflective element 61 in at least one rotational direction to correct for at least some of the camera 15 movement. Tilting the reflective surface may correct for at least some of the camera movement, thereby creating a stabilization effect. The reflection control element may be connected to at least one sensor providing data of the movements of the apparatus and/or the camera. The stabilizing module may be separate from the reflection control element providing only the information for tilting the reflective surface 61. The movement sensor data may include the movement of the second body 12 and/or the movement data of the reflective surface 61.

Figure 7:
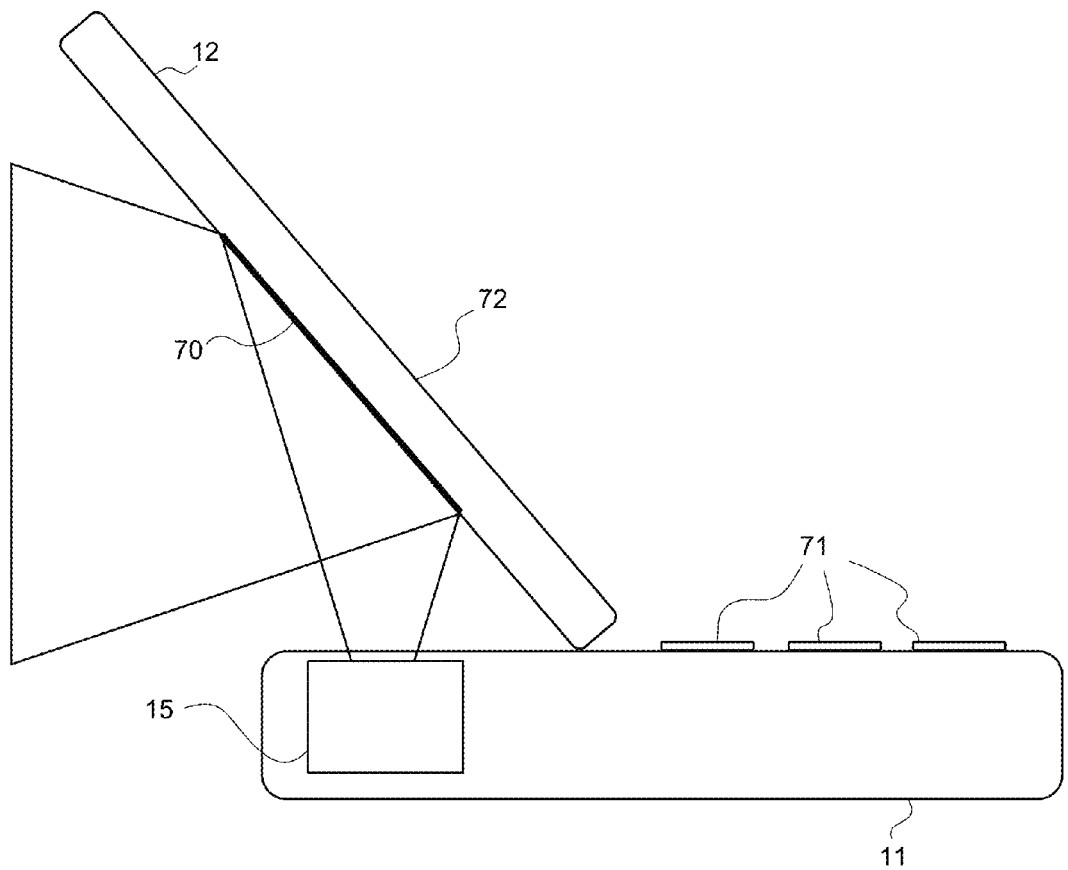
FIG. 7 is a schematic diagram of an apparatus comprising a keyboard and/or a display.

FIG. 7 shows an example of an embodiment, where the first body comprises a keyboard 71 or any interface to be used while operating the camera 15. The keyboard area 71 may be used for real-time adjustments of camera characteristics, such as white balance, colors or any other parameter that is further illustrated on a display 72. Other examples of functions that may be applied are a display 72 on the second body 12, wherein the display 72 may have touch screen functionality. The reflective surface 70 is available on the opposite side of the second body 12.

Figure 8A:
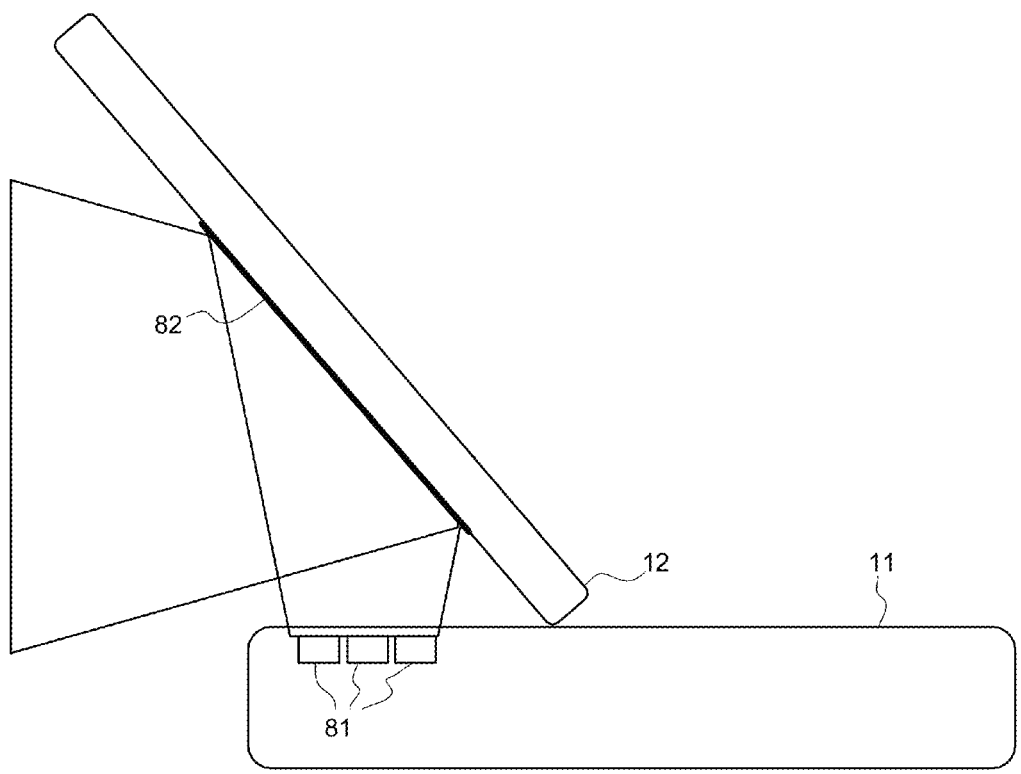
FIG. 8a is a schematic diagram of an apparatus comprising a flash element in an open position.
Figure 8B:
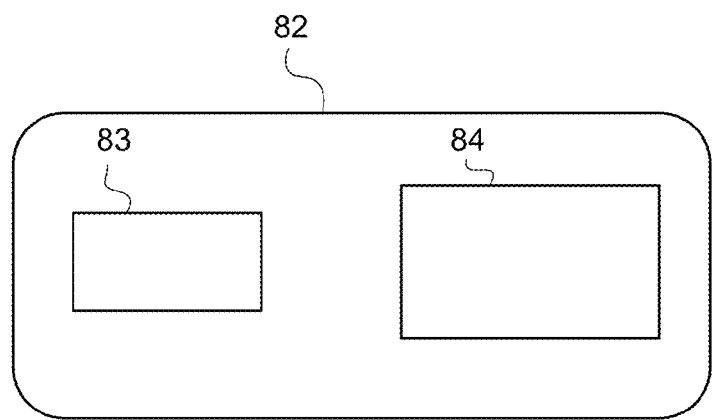
FIG. 8b is a schematic diagram of reflective surfaces on a second body.
Figure 8C:
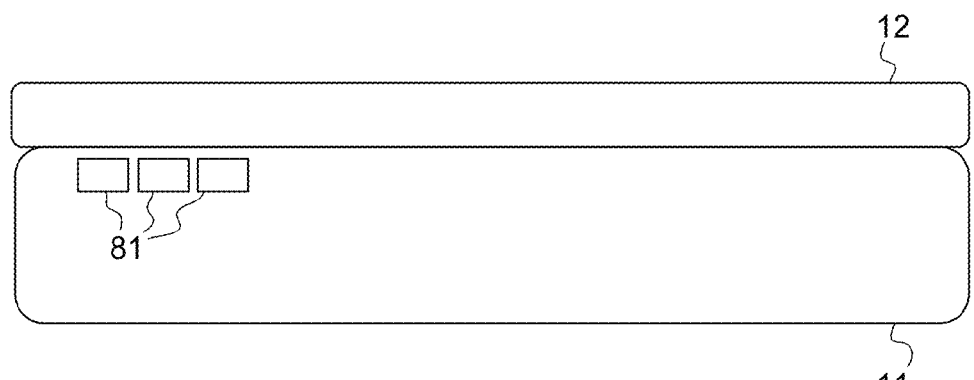
FIG. 8c is a schematic diagram of the apparatus comprising the flash element in a closed position.

In an embodiment the first body comprises at least one flash element positioned so that when the flash is used and the apparatus is in the open position, light from the flash element illuminates a camera subject via the reflective element. The first body 12 comprises at least one flash element 81, wherein in the open position the light from the flash element 81 illuminates a camera 15 subject via the reflective element 82, as illustrated in an example of FIG. 8*a*. The flash element 81 may be arranged as an array of flashes. FIG. 8*b* illustrates an embodiment, where the reflective surface comprises at least two areas at a distance from each other. The first reflective surface 83 is purposed for the camera and the second reflective surface 84 is purposed for the flash. The reflective surfaces 83, 84 are separated to decrease or remove any interference between the camera 15 and the flash element 81. The camera 15 is not illustrated in this example, but it may be located in the area suitable for using the reflective surface 83. FIG. 8*c* illustrates an embodiment wherein the second body 12 covers the flash element 81 that is arranged into the first body 11.

Figure 9:
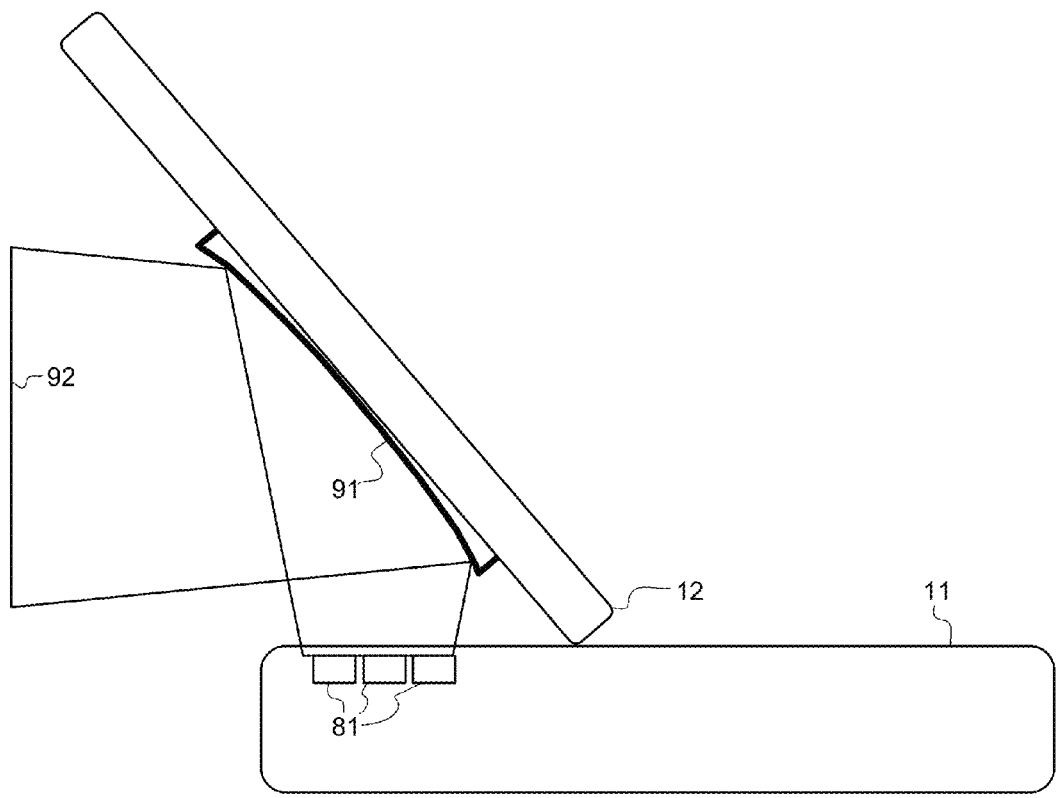
FIG. 9 is a schematic diagram of an apparatus comprising a flash element in an open position utilizing the deformed reflective surface.
Figure 10:
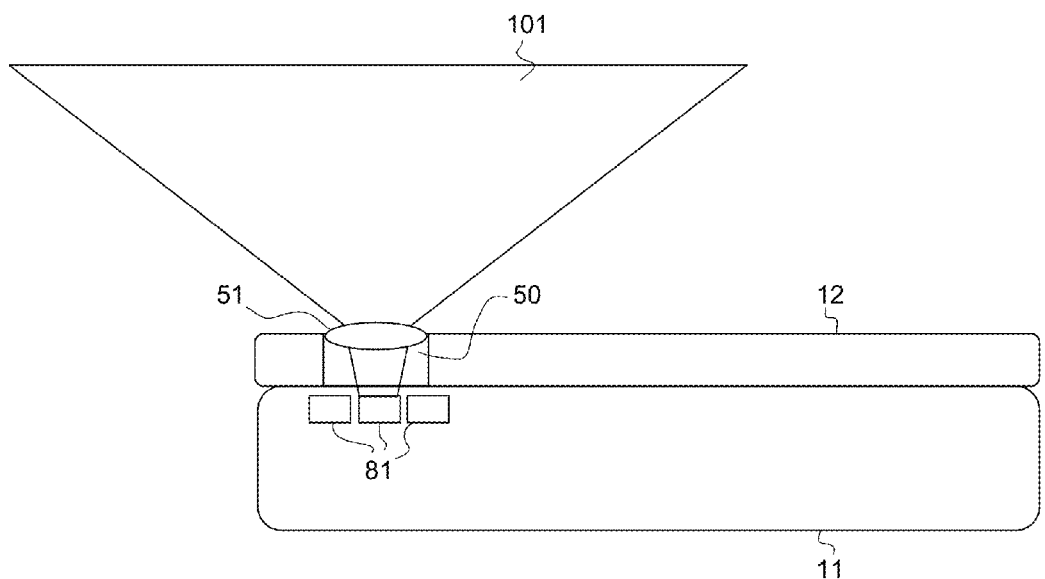
FIG. 10 is a schematic diagram of an apparatus comprising a flash element in a closed position utilizing the aperture and lens on the second body.

FIG. 9 illustrates an embodiment that applies the deforming reflective surface 91 to modify the flash cone 92. The flash element 81 illuminates the reflective surface 91 that is deformed into concave shape. The light is focused and the usable lighting effect reaches further than without the focus. When the first body 11 and the second body 12 are in the closed position, an embodiment as illustrated in FIG. 10 uses the aperture 50 and the lens 51 to change the focus of the light illuminated by the flash. A flash light function may be used as the lens 51 is chosen to the desired illumination distance. The chosen illumination distance may be different from the distance achieved in the open position.

Figure 11A:
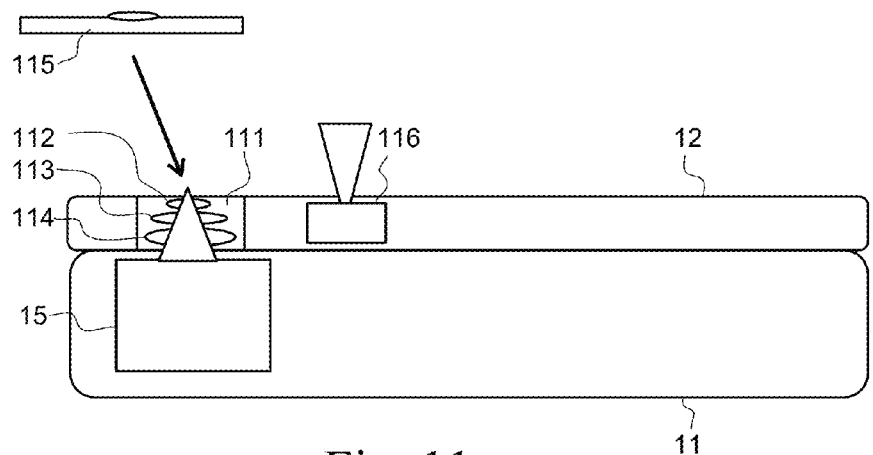
FIG. 11a is a schematic diagram of an apparatus in a closed position comprising an aperture and a lens in the second body with a switchable optic module.
Figure 11B:
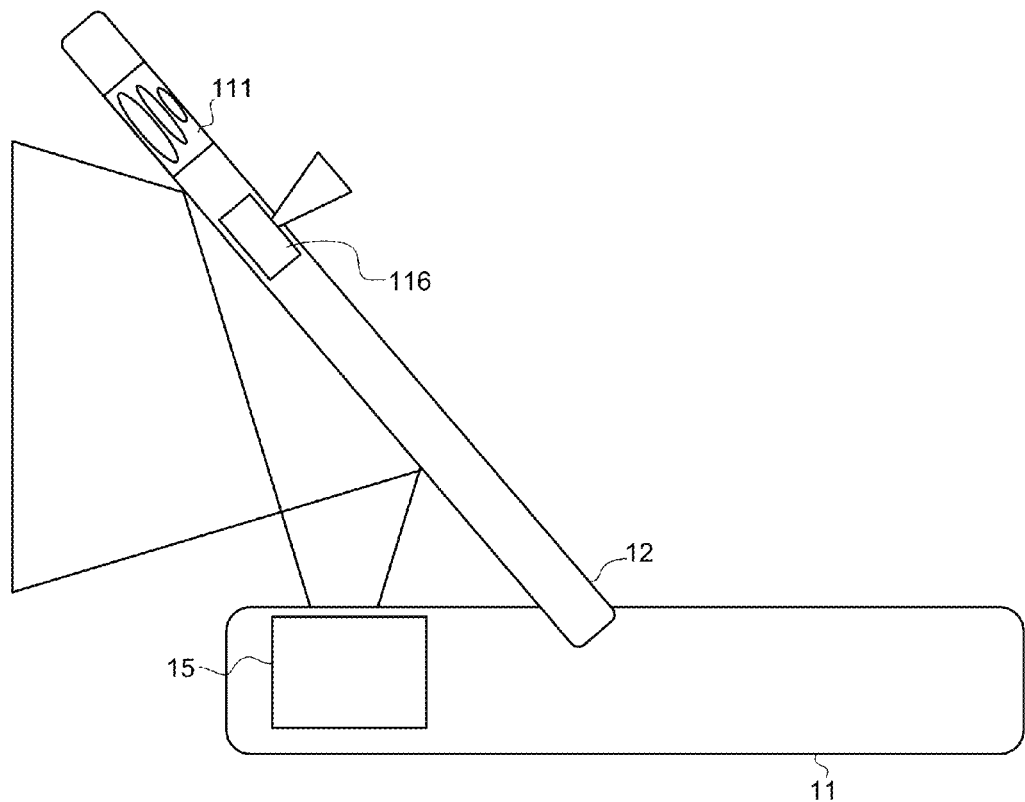
FIG. 11b is a schematic diagram of the apparatus in an open position comprising an aperture and a lens in the second body with a switchable optic module.

FIGS. 11*a* and 11*b* illustrate an embodiment, wherein the camera 15 on the first body 11 is used with changeable optic module 111. The optic module 111 is arranged on the aperture of the second body 12 in front of the camera 15. The optic module 111 may comprise one or more lenses 112, 113, 114 to enable different optical characteristics, for example a microscope application. The microscope application may use a specimen on a glass plate 115, wherein the optic module provides the desired magnification. In the open position the optic module 111 folds away from the view of the camera 15. This example also illustrates separate secondary camera 116 on the second body. Switchable optics on the optic module 111 enable various optics used for special purposes.

FIG. 12*a* illustrates an embodiment of an apparatus in a closed position, wherein the hinge 122 is arranged to slidably move inside a groove 121. FIG. 12*b* illustrates the same embodiment in an open position. The first body 11 comprises the camera 15, wherein the hinge 122 between the first body 11 and the second body 12 allows the second body to open slidably over the first body. The first body 11 may be considered a static element, wherein the second body 12 performs open/close movement with at least one arm hingedly attached to the first body 11 and the second body 12. The apparatus may comprise three or four arms to enable opening movement. The opening movement may be regarded as flipping movement. Sliding and rotational movements may be operatively connected to the apparatus with different hinge and/or slide configurations.

An embodiment of the apparatus comprises a first body comprising a camera on a first side of the first body, a second body attached to the first body, the second body comprising a reflective element on a first side of the second body, the apparatus having an open and a closed position. In the closed position the first side of the first body and the first side of the second body are facing each other. In the open position and the camera is arranged to view the subject via the reflective element. In an embodiment in the open position the reflective element is at a sharp angle in relation to the camera.

An embodiment comprises a processor and a memory storing instructions that, when executed, cause the apparatus to reverse the image captured by the camera. The camera captures a mirrored image, which the apparatus mirrors back to the original mode.

In an embodiment the second body is attached to the first body by at least one hinge, and further comprises an electrical connection and a mechanical connection between the first and the second body. Electrical power and/or information and/or signals may be transferred between the first body and the second body.

In an embodiment a micromirror array causes the surface of the reflective element to deform. In an embodiment a magnetic element causes the surface of the reflective element to deform. The surface of the reflective element may comprise a membrane configured to deform.

In an embodiment the reflection control element comprises a receiver for receiving input data corresponding to a camera movement, and the reflection control element, when operated, causes at least the surface of the reflective element to tilt in at least one rotational direction to correct for at least some of the camera movement.

In an embodiment the apparatus comprises a lens in the second body positioned in the second body so that when the apparatus is in the closed position, the lens is, in a traverse direction to a horizontal plane of the second body, at least partially aligned with the camera allowing light to enter the camera through the lens. The lens may be replaceable or it may be connected to a lens holder or a lens module. More than one lens may be used to further modify the optical characteristics.

In an embodiment the first body comprises at least one flash element positioned so that when the flash is used and the apparatus is in the open position, light from the flash element illuminates a camera subject via the reflective element.

A method for an apparatus comprises a first body comprising a camera on a first side of the first body; a second body attached to the first body; the second body comprising a reflective element on a first side of the second body; the apparatus having an open and a closed position; and wherein in the closed position the first side of the first body and the first side of the second body are facing each other, the second body thereby covering the camera and the first body covering the reflective element, said method comprising: in the open position, the reflective element reflecting light from a subject to the camera.

An embodiment of the method comprises deforming at least the surface of the reflective element as a response to a reflection control element. An embodiment of the method comprises changing the reflectivity of the reflective element by a reflection control element. An embodiment of the method comprises deforming the surface of the reflective element by a MEMS micromirror array. An embodiment of the method comprises deforming at least the surface of the reflective element by a magnetic element. An embodiment of the method comprises tilting at least the surface of the reflective element by a reflection control element, wherein the reflection control element comprises a receiver for the input data corresponding to a camera movement and the reflection control element causes at least the surface of the reflective element to tilt in at least one rotational direction to correct for at least some of the camera movement. An embodiment of the method comprises operating the camera in the closed position wherein the second body covering the camera comprises a lens allowing the light to enter the camera. An embodiment of the method comprises illuminating a camera subject via the reflective element in the open position by the light from the flash element.

A system comprises a camera, a processor and a memory storing instructions that, when executed, control the operation of the camera; a first body comprising the camera on a first side of the first body; a second body attached to the first body; the second body comprising a reflective element on a first side of the second body; the first body and the second body forming an open and a closed position; and wherein in the closed position the first side of the first body and the first side of the second body are facing each other, the second body thereby covering the camera and the first body covering the reflective element.

In an embodiment of the system the reflective element comprises a surface, and the system further comprising a reflection control element being controlled by the processor, wherein when controlled, the processor causes the surface of the reflective element to change its physical form, reflectivity or its rotational direction in relation to the second body.

An embodiment of an apparatus comprises: a first body comprising a camera on a first side of the first body; a second body attached to the first body; the second body comprising a reflective element on a first side of the second body; the apparatus having an open and a closed position; wherein in the closed position the first side of the first body and the first side of the second body are facing each other, the second body thereby covering the camera and the first body covering the reflective element; and in the open position the reflective element reflects light from a subject to the camera. In an embodiment of an apparatus the reflective element comprises a surface, and the apparatus further comprises means for deforming at least the surface of the reflective element. An embodiment of an apparatus comprises means for changing the reflectivity of the reflective element. In an embodiment of an apparatus the reflective element comprises a surface, and the surface of the reflective element comprises a micromirror array or a magnetic element for deforming the surface. An embodiment of an apparatus comprises a reflection control element, wherein the reflection control element comprises means for receiving input data corresponding to a camera movement, and the reflection control element, when operated, causes at least the surface of the reflective element to tilt in at least one rotational direction to correct for at least some of the camera movement. An embodiment of an apparatus comprises a lens in the second body positioned in the second body so that when the apparatus is in the closed position, the lens is, in a traverse direction to a horizontal plane of the second body, at least partially aligned with the camera allowing light to enter the camera through the lens. In an embodiment of an apparatus the first body comprises at least one flash element positioned so that when the flash is used and the apparatus is in the open position, light from the flash element illuminates a camera subject via the reflective element. An embodiment of an apparatus comprises at least one elongated member having a first end and a second end, the elongated member being hingedly connected from the first end to the first body and from the second end to the second body. An embodiment of an apparatus comprises a processor and a memory storing instructions that, when executed, cause the apparatus to reverse the image captured by the camera. In an embodiment of an apparatus the second body is attached to the first body by at least one hinge, and further comprises an electrical connection and a mechanical connection between the first and the second body.

An embodiment of the system comprises a camera; a processor and a memory storing instructions that, when executed, control the operation of the camera; a first body comprising the camera on a first side of the first body; a second body attached to the first body; the second body comprising a reflective element on a first side of the second body; the first body and the second body forming an open and a closed position; and wherein in the closed position the first side of the first body and the first side of the second body are facing each other, the second body thereby covering the camera and the first body covering the reflective element. In an embodiment of the system the reflective element comprises a surface, and the system further comprising a reflection control element being controlled by the processor, wherein when controlled, the processor causes the surface of the reflective element to change its physical form, reflectivity or its rotational direction in relation to the second body. An embodiment of the system comprises a lens in the second body positioned in the second body so that when the apparatus is in the closed position, the lens is, in a traverse direction to a horizontal plane of the second body, at least partially aligned with the camera allowing light to enter the camera through the lens. In an embodiment of the system the first body comprises at least one flash element positioned so that when the flash is used and the apparatus is in the open position, light from the flash element illuminates a camera subject via the reflective element. An embodiment of the system comprises a processor and a memory storing instructions that, when executed, cause the apparatus to reverse the image captured by the camera.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the reflection control element functionality may be performed by one or more hardware logic components.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to configure the device for a particular user such as by receiving information about bone lengths of the user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus comprising:
a first body comprising a camera on a first side of the first body;
a second body attached to the first body;
the second body comprising a reflective element on a first side of the second body;

the apparatus having an open and a closed position; and
  wherein in the closed position the first side of the first body and the first side of the second body are facing each other, the second body thereby covering the camera and the first body covering the reflective element; and
at least one of:
  the reflective element comprising a surface, and the apparatus further comprising a reflection control element being controlled by a processor, wherein when controlled, the processor causes the surface of the reflective element to change its physical form, reflectivity or its rotational direction in relation to the second body;
  the second body being attached to the first body by at least one hinge, and the apparatus further comprising an electrical connection and a mechanical connection between the first and the second body; or
  the apparatus further comprising a lens in the second body positioned in the second body so that when the apparatus is in the closed position, the lens is, in a traverse direction to a horizontal plane of the second body, at least partially aligned with the camera allowing light to enter the camera through the lens.

2. An apparatus according to claim 1, wherein in the open position the reflective element reflects light from a subject to the camera.

3. An apparatus according to claim 1, wherein the second body further comprises a second reflective element arranged to reflect light emitted from at least one flash element positioned in the first body, and the system further comprising a second reflection control element being controlled by the processor, wherein when controlled, the processor causes the surface of the second reflective element to change its physical form.

4. An apparatus according to claim 1, comprising a reflection control element causing the reflectivity of the reflective element to change.

5. An apparatus according to claim 1, wherein the reflective element comprises a surface, and the surface of the reflective element comprises a micromirror array for deforming the surface.

6. An apparatus according to claim 1, wherein the reflective element comprises a surface, and the reflective element comprises a magnetic element for deforming at least the surface of the reflective element.

7. An apparatus according to claim 1, comprising a lens in the second body positioned in the second body so that when the apparatus is in the closed position, the lens is, in a traverse direction to a horizontal plane of the second body, at least partially aligned with the camera allowing light to enter the camera through the lens.

8. An apparatus according to claim 1, wherein the first body comprises at least one flash element positioned so that when the flash is used and the apparatus is in the open position, light from the flash element illuminates a camera subject via the reflective element.

9. An apparatus according to claim 1, comprising at least one elongated member having a first end and a second end, the elongated member being hingedly connected from the first end to the first body and from the second end to the second body.

10. An apparatus comprising:
  a first body comprising a camera on a first side of the first body;
  a second body attached to the first body;
  the second body comprising a reflective element on a first side of the second body;
  the apparatus having an open and a closed position; and
    wherein in the closed position the first side of the first body and the first side of the second body are facing each other;
  in the open position the camera is arranged to view the subject via the reflective element; and
  at least one of:
    the reflective element comprising a surface, and the apparatus further comprising a reflection control element being controlled by a processor, wherein when controlled, the processor causes the surface of the reflective element to change its physical form, reflectivity or its rotational direction in relation to the second body;
    the second body being attached to the first body by at least one hinge, and the apparatus further comprising an electrical connection and a mechanical connection between the first and the second body; or
    the apparatus further comprising a lens in the second body positioned in the second body so that when the apparatus is in the closed position, the lens is, in a traverse direction to a horizontal plane of the second body, at least partially aligned with the camera allowing light to enter the camera through the lens.

11. An apparatus according to claim 10 comprising a processor and a memory storing instructions that, when executed, cause the apparatus to reverse the image captured by the camera.

12. An apparatus according to claim 10, wherein the second body is attached to the first body by at least one hinge, and further comprises an electrical connection and a mechanical connection between the first and the second body.

13. An apparatus according to claim 10, wherein the reflective element comprises a surface and a micromirror array causing the surface of the reflective element to deform.

14. An apparatus according to claim 10, wherein the reflective element comprises a surface and a magnetic element causing the surface of the reflective element to deform.

15. An apparatus according to claim 10, wherein the second body further comprises a second reflective element arranged to reflect light emitted from at least one flash element positioned in the first body, and the system further comprising a second reflection control element being controlled by the processor, wherein when controlled, the processor causes the surface of the second reflective element to change its physical form.

16. An apparatus according to claim 10, comprising a lens in the second body positioned in the second body so that when the apparatus is in the closed position, the lens is, in a traverse direction to a horizontal plane of the second body, at least partially aligned with the camera allowing light to enter the camera through the lens.

17. An apparatus according to claim 10, wherein the first body comprises at least one flash element positioned so that when the flash is used and the apparatus is in the open position, light from the flash element illuminates a camera subject via the reflective element.

18. A system, comprising:
  a camera;
  a processor and a memory storing instructions that, when executed, control the operation of the camera;
  a first body comprising the camera on a first side of the first body;
  a second body attached to the first body;
  the second body comprising a reflective element on a first side of the second body;

the first body and the second body forming an open and a closed position; and wherein in the closed position the first side of the first body and the first side of the second body are facing each other, the second body thereby covering the camera and the first body covering the reflective element; and at least one of:

the reflective element comprising a surface, and the system further comprising a reflection control element being controlled by the processor, wherein when controlled, the processor causes the surface of the reflective element to change its physical form, reflectivity or its rotational direction in relation to the second body;

the second body being attached to the first body by at least one hinge, and the apparatus further comprising an electrical connection and a mechanical connection between the first and the second body; or the apparatus further comprising a lens in the second body positioned in the second body so that when the apparatus is in the closed position, the lens is, in a traverse direction to a horizontal plane of the second body, at least partially aligned with the camera allowing light to enter the camera through the lens.

19. A system according to claim 18, wherein the second body further comprises a second reflective element arranged to reflect light emitted from at least one flash element positioned in the first body, and the system further comprising a second reflection control element being controlled by the processor, wherein when controlled, the processor causes the surface of the second reflective element to change its physical form.

20. An system according to claim 18, wherein the surface of the reflective element comprises at least one of a micromirror array or a magnetic element for deforming the surface.

* * * * *